(12) United States Patent
Han (10) Patent No.: US 11,501,250 B2
(45) Date of Patent: Nov. 15, 2022

(54) REFRIGERATOR FOR PROVIDING INFORMATION ON ITEM USING ARTIFICIAL INTELLIGENCE AND METHOD OF OPERATING THE SAME

(71) Applicant: LG ELECTRONICS INC., Seoul (KR)

(72) Inventor: Jongwoo Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 556 days.

(21) Appl. No.: 16/562,843

(22) Filed: Sep. 6, 2019

(65) Prior Publication Data

US 2019/0392383 A1 Dec. 26, 2019

(30) Foreign Application Priority Data

Aug. 9, 2019 (KR) .......................... 10-2019-0097451

(51) Int. Cl.
| | |
|---|---|
| *F25D 29/00* | (2006.01) |
| *G06Q 10/08* | (2012.01) |
| *F25D 27/00* | (2006.01) |
| *G06N 3/08* | (2006.01) |
| *G06N 20/00* | (2019.01) |

(52) U.S. Cl.
CPC .......... *G06Q 10/087* (2013.01); *F25D 27/005* (2013.01); *F25D 29/00* (2013.01); *G06N 3/08* (2013.01); *G06N 20/00* (2019.01); *F25D 2500/06* (2013.01); *F25D 2700/02* (2013.01); *F25D 2700/04* (2013.01); *F25D 2700/06* (2013.01)

(58) Field of Classification Search
CPC ...... F25D 27/005; F25D 29/00; F25D 29/005; F25D 2500/06; F25D 2700/04; F25D 2700/06
See application file for complete search history.

(56) References Cited

U.S. PATENT DOCUMENTS

| | | | |
|---|---|---|---|
| 2004/0035123 A1* | 2/2004 | Kim ........................ | F25D 29/00 236/51 |
| 2008/0195944 A1* | 8/2008 | Lee ......................... | F25D 29/00 715/706 |
| 2016/0092066 A1 | 3/2016 | Jeon | |
| 2017/0193589 A1* | 7/2017 | Scholz .................... | G06F 16/95 |

(Continued)

FOREIGN PATENT DOCUMENTS

| | | |
|---|---|---|
| KR | 10-1770240 B1 | 8/2017 |
| KR | 10-2018-0017741 A | 2/2018 |

(Continued)

*Primary Examiner* — Jonathan Bradford
(74) *Attorney, Agent, or Firm* — Birch, Stewart, Kolasch & Birch, LLP (57) ABSTRACT

A refrigerator for providing an item guide service using artificial intelligence includes an output unit, a sensing unit configured to acquire user identification information for identifying a user, a memory configured to store a collaborative filtering model for determining an item to be used by the user, and a processor configured to recognize the user based on the acquired user identification information, predict an item to be used by the recognized user using the collaborative filtering model and output item identification information for identifying the predicted item through the output unit.

6 Claims, 7 Drawing Sheets

(56) References Cited

U.S. PATENT DOCUMENTS

| | | | | |
|---|---|---|---|---|
| 2019/0078833 | A1* | 3/2019 | Graziano | ............... F25D 13/00 |
| 2019/0348044 | A1* | 11/2019 | Chun | ................... F25D 29/005 |
| 2019/0371002 | A1 | 12/2019 | Hwang | |

FOREIGN PATENT DOCUMENTS

| KR | 10-2018-0080112 A | 7/2018 |
|---|---|---|
| KR | 10-2018-0121466 A | 11/2018 |
| KR | 10-2019-0085895 A | 7/2019 |

* cited by examiner

| USER | TIME | ITEM |
|------|------|-------|
| A | 22:50 | WINE |
| A | 21:49 | WINE |
| A | 20:03 | WATER |
| B | 22:50 | MILK |
| B | 21:49 | JUICE |
| B | 20:03 | APPLE |

PROBABILITY THAT MALE IN HIS THIRTIES USES ITEM FOR EACH TIME PERIOD
(PROBABILITY = NUMBER OF TIMES OF USAGES/DATE OF USAGE)

|  | 0:00 TO 3:00 | 3:00 TO 6:00 | 6:00 TO 9:00 | 9:00 TO 12:00 | 12:00 TO 15:00 | 15:00 TO 18:00 | 18:00 TO 21:00 | 21:00 TO 24:00 |
|---|---|---|---|---|---|---|---|---|
| WATER | 10% | N/A | 30% | N/A | 30% | N/A | 30% | N/A |
| COLA | N/A | N/A | N/A | 10% | N/A | N/A | N/A | N/A |
| FRUIT | N/A | N/A | 50% | N/A | N/A | N/A | N/A | N/A |
| JUICE | N/A | N/A | 50% | N/A | N/A | N/A | N/A | N/A |
| COOKIE | N/A | N/A | N/A | N/A | N/A | 80% | N/A | N/A |
| SALAD | N/A | N/A | 50% | N/A | N/A | N/A | N/A | N/A |

PROBABILITY THAT MALES IN THEIR THIRTIES USE WATER FOR EACH TIME PERIOD

|        | 0:00 TO 3:00 | 3:00 TO 6:00 | 6:00 TO 9:00 | 9:00 TO 12:00 | 12:00 TO 15:00 | 15:00 TO 18:00 | 18:00 TO 21:00 | 21:00 TO 24:00 |
|--------|--------------|--------------|--------------|---------------|----------------|----------------|----------------|----------------|
| MALE A | 10%          | N/A          | 30%          | N/A           | 30%            | N/A            | 30%            | N/A            |
| MALE B | N/A          | 10%          | N/A          | 30%           | N/A            | 30%            | N/A            | 30%            |
| MALE C | 30%          | N/A          | 50%          | 20%           | 30%            | 10%            | 30%            | N/A            |
| MALE D | 10%          | N/A          | 30%          | N/A           | 30%            | N/A            | 30%            | N/A            |
| MALE E | N/A          | 5%           | 10%          | N/A           | N/A            | 80%            | N/A            | 20%            |
| MALE F | N/A          | N/A          | 50%          | N/A           | N/A            | N/A            | N/A            | N/A            |

|        | 0:00 TO 3:00 | 3:00 TO 6:00 | 6:00 TO 9:00 | 9:00 TO 12:00 | 12:00 TO 15:00 | 15:00 TO 18:00 | 18:00 TO 21:00 | 21:00 TO 24:00 |
|--------|--------------|--------------|--------------|---------------|----------------|----------------|----------------|----------------|
| WATER  | 10%          | 2.5%         | 30%          | 8.33%         | 30%            | 20%            | 30%            | 8.33%          |
| COLA   | 5%           | 5.5%         | 15%          | 25%           | 5%             | 55%            | 13%            | 5%             |
| FRUIT  | 7%           | 17%          | 27%          | 37%           | 47%            | 57%            | 27%            | 25%            |
| JUICE  | 8%           | 15%          | 50%          | 27%           | 30%            | 20%            | 15%            | 10%            |
| COOKIE | 20%          | 10%          | 15%          | 25%           | 30%            | 80%            | 40%            | 10%            |
| SALAD  | 15%          | 25%          | 50%          | 30%           | 15%            | 20%            | 5%             | 7%             |

REFRIGERATOR FOR PROVIDING INFORMATION ON ITEM USING ARTIFICIAL INTELLIGENCE AND METHOD OF OPERATING THE SAME

CROSS-REFERENCE TO RELATED APPLICATIONS

This application claims the priority benefit of Korean Patent Application No. 10-2019-0097451 filed on Aug. 9, 2019, which is hereby incorporated by reference as if fully set forth herein.

BACKGROUND

The present disclosure relates to a refrigerator for providing information on an item using artificial intelligence.

In general, a refrigerator refers to a storage space having storage compartments for storing food and articles and configured to store food and articles at low temperatures for a long time by a refrigeration cycle for circulating refrigerant to exchange heat.

Recently, the refrigerators have various additional functions, that is, an input function, a display function, an Internet function or the like, in addition to an existing function for storing food and articles.

In addition, small refrigerators used for specific persons to store only specific items in specific spaces are also popular.

According to personalization of small refrigerators, it is necessary to provide item services optimized for specific persons who use small refrigerators.

SUMMARY

An object of the present disclosure is to provide a refrigerator capable of recognizing a user and recommending an item to be suitably used by the recognized user.

Another object of the present disclosure is to provide a refrigerator capable of automatically recognizing a user and enabling the recognized user to easily access an item.

A refrigerator for providing an item guide service using artificial intelligence according to an embodiment of the present disclosure includes an output unit, a sensing unit configured to acquire user identification information for identifying a user, a memory configured to store a collaborative filtering model for determining an item to be used by the user, and a processor configured to recognize the user based on the acquired user identification information, predict an item to be used by the recognized user using the collaborative filtering model and output item identification information for identifying the predicted item through the output unit.

A refrigerator for providing an item guide service using artificial intelligence according to an embodiment of the present disclosure includes an output unit, a sensing unit configured to acquire user identification information for identifying a user, a memory configured to store a usage pattern model for determining an item to be used by the user based on situation data of the user, and a processor configured to recognize the user based on the acquired user identification information, predict an item to be used by the recognized user using the usage pattern model and output item identification information for identifying the predicted item through the output unit.

DETAILED DESCRIPTION OF THE EMBODIMENTS

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

Figure 1:
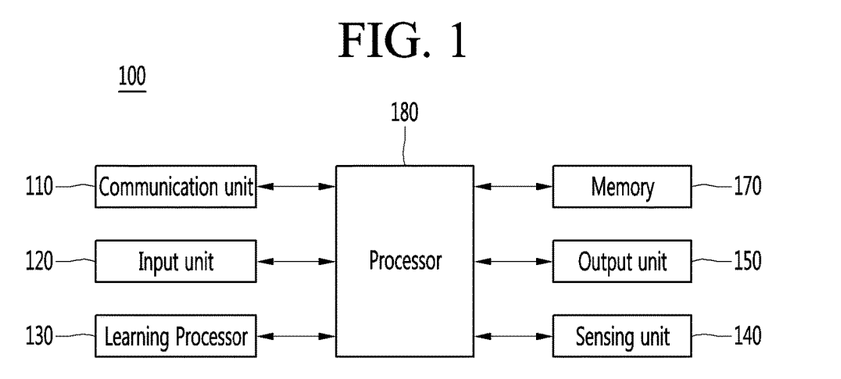
FIG. 1 is a view showing an artificial intelligence (AI) device according to an embodiment of the present disclosure.

FIG. 1 illustrates an AI device 100 according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
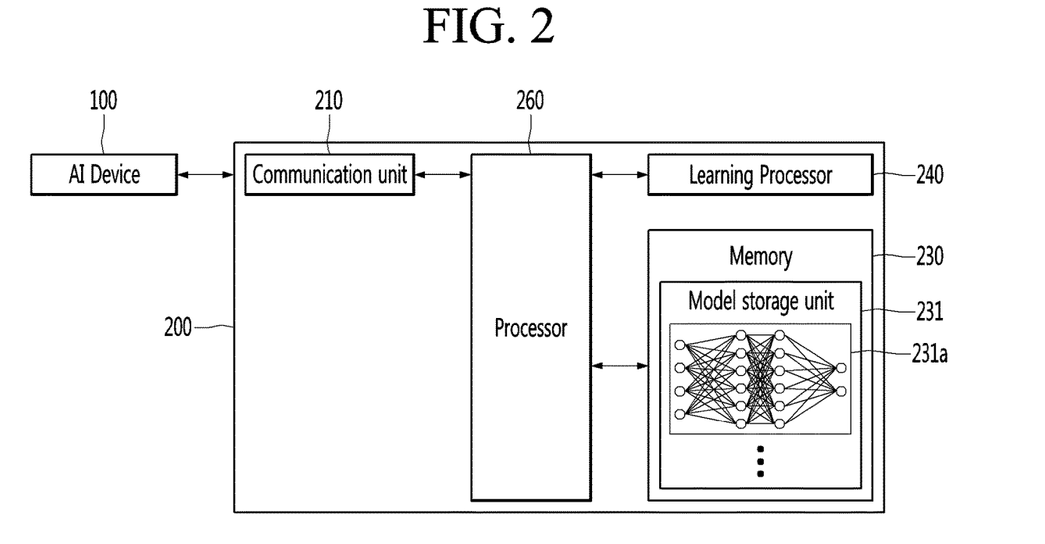
FIG. 2 is a view showing an AI server according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
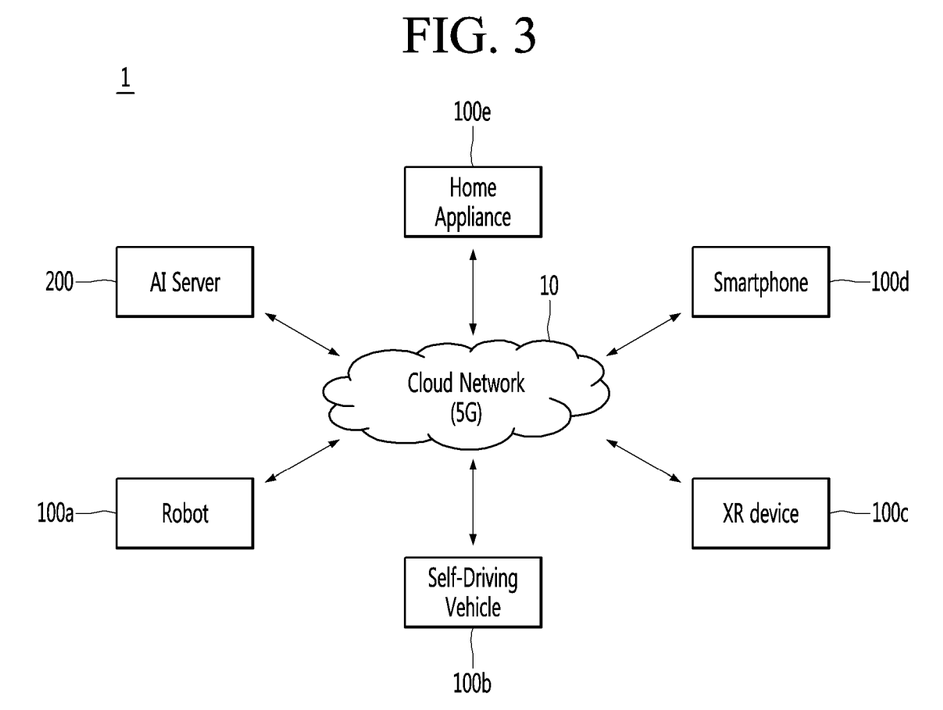
FIG. 3 is a view showing an AI system according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100*d*, or the home appliance 100*e* through the cloud network 10, and may assist at least part of AI processing of the connected AI devices 100*a* to 100*e*.

At this time, the AI server 200 may learn the artificial neural network according to the machine learning algorithm instead of the AI devices 100*a* to 100*e*, and may directly store the learning model or transmit the learning model to the AI devices 100*a* to 100*e*.

At this time, the AI server 200 may receive input data from the AI devices 100*a* to 100*e*, may infer the result value for the received input data by using the learning model, may generate a response or a control command based on the inferred result value, and may transmit the response or the control command to the AI devices 100*a* to 100*e*.

Alternatively, the AI devices 100*a* to 100*e* may infer the result value for the input data by directly using the learning model, and may generate the response or the control command based on the inference result.

Hereinafter, various embodiments of the AI devices 100*a* to 100*e* to which the above-described technology is applied will be described. The AI devices 100*a* to 100*e* illustrated in FIG. 3 may be regarded as a specific embodiment of the AI device 100 illustrated in FIG. 1.

<AI+Robot>

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100*a* may acquire state information about the robot 100*a* by using sensor information acquired from various kinds of sensors, may detect (recognize) surrounding environment and objects, may generate map data, may determine the route and the travel plan, may determine the response to user interaction, or may determine the operation.

The robot 100*a* may use the sensor information acquired from at least one sensor among the lidar, the radar, and the camera so as to determine the travel route and the travel plan.

The robot 100*a* may perform the above-described operations by using the learning model composed of at least one artificial neural network. For example, the robot 100*a* may recognize the surrounding environment and the objects by using the learning model, and may determine the operation by using the recognized surrounding information or object information. The learning model may be learned directly from the robot 100*a* or may be learned from an external device such as the AI server 200.

At this time, the robot 100*a* may perform the operation by generating the result by directly using the learning model, but the sensor information may be transmitted to the external device such as the AI server 200 and the generated result may be received to perform the operation.

The robot 100*a* may use at least one of the map data, the object information detected from the sensor information, or the object information acquired from the external apparatus to determine the travel route and the travel plan, and may control the driving unit such that the robot 100*a* travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving unit based on the control/interaction of the user. At this time, the robot 100*a* may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the route and the travel plan, or may determine the operation.

Like the robot 100*a*, the self-driving vehicle 100*b* may use the sensor information acquired from at least one sensor among the lidar, the radar, and the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

At this time, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external apparatus to determine the travel route and the travel plan, and may control the driving unit such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
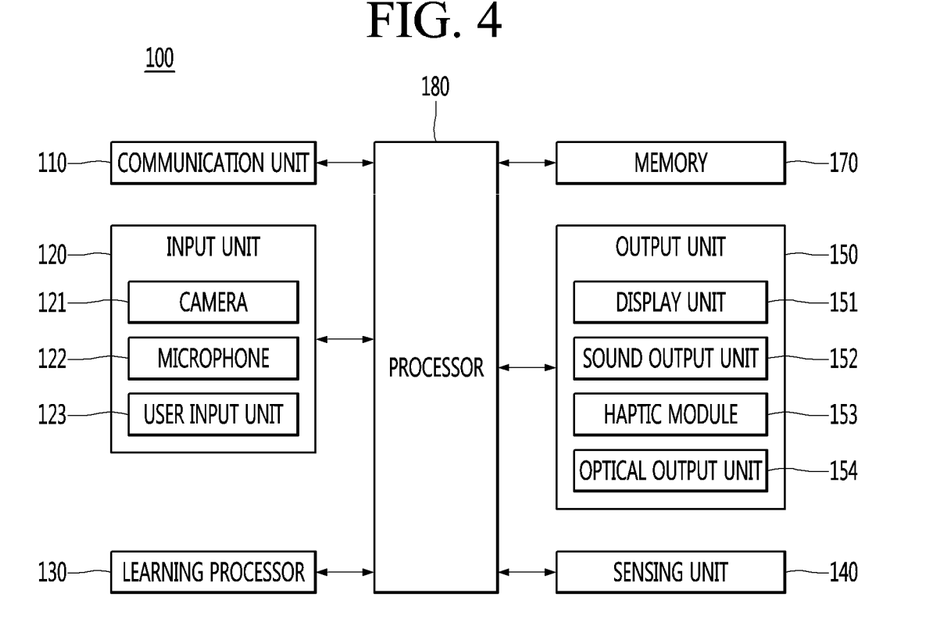
FIG. 4 is a view showing an artificial intelligence (AI) device according to another embodiment of the present disclosure.

FIG. 4 shows an AI device 100 according to an embodiment of the present disclosure.

A repeated description of FIG. 1 will be omitted.

Referring to FIG. 4, an input unit 120 may include a camera 121 for receiving a video signal, a microphone 122 for receiving an audio signal and a user input unit 123 for receiving information from a user.

Audio data or image data collected by the input unit 120 may be analyzed and processed as a control command of the user.

The input unit 120 receives video information (or signal), audio information (or signal), data or information received from the user, and the AI device 100 may include one or a plurality of cameras 121 for input of the video information.

The camera 121 processes an image frame such as a still image or a moving image obtained by an image sensor in a video call mode or a shooting mode. The processed image frame may be displayed on a display unit 151 or stored in a memory 170.

The microphone 122 processes external acoustic signals into electrical sound data. The processed sound data may be variously utilized according to the function (or the application program) performed in the AI device 100. Meanwhile, various noise removal algorithms for removing noise generated in a process of receiving the external acoustic signal is applicable to the microphone 122.

The user input unit 123 receives information from the user. When information is received through the user input unit 123, a processor 180 may control operation of the AI device 100 in correspondence with the input information.

The user input unit 123 may include a mechanical input element (or a mechanical key, for example, a button located on a front/rear surface or a side surface of the terminal 100, a dome switch, a jog wheel, a jog switch, and the like) and a touch input element. As one example, the touch input element may be a virtual key, a soft key or a visual key, which is displayed on a touchscreen through software processing, or a touch key located at a portion other than the touchscreen.

An output unit 150 may include at least one of a display unit 151, a sound output unit 152, a haptic module 153, and a light output unit 154.

The display unit 151 displays (outputs) information processed in the AI device 100. For example, the display unit 151 may display execution screen information of an application program executing at the AI device 100 or user interface (UI) and graphical user interface (GUI) information according to the execution screen information.

The display unit 151 may have an inter-layered structure or an integrated structure with a touch sensor so as to implement a touchscreen. The touchscreen may provide an output interface between the terminal 100 and a user, as well as functioning as the user input unit 123 which provides an input interface between the AI device 100 and the user.

The sound output unit 152 may output audio data received from a communication unit 110 or stored in the memory 170 in a call signal reception mode, a call mode, a record mode, a voice recognition mode, a broadcast reception mode, and the like.

The sound output unit 152 may include at least one of a receiver, a speaker, a buzzer or the like.

The haptic module 153 may generate various tactile effects that can be felt by a user. A representative example of tactile effect generated by the haptic module 153 may be vibration.

The light output unit 154 may output a signal indicating event generation using light of a light source of the AI device 100. Examples of events generated in the AI device 100 may include a message reception, a call signal reception, a missed call, an alarm, a schedule notice, an email reception, an information reception through an application, and the like.

Figure 5:
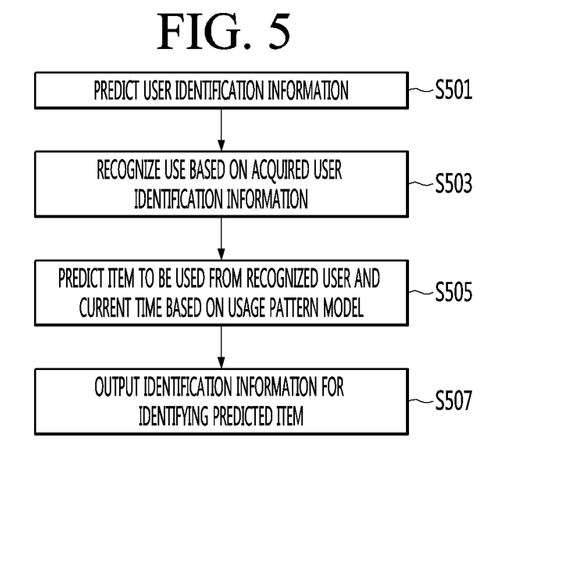
FIG. 5 is a flowchart illustrating a method of providing information on an item at a refrigerator according to an embodiment of the present disclosure.

FIG. 5 is a flowchart illustrating a method of providing information on an item at a refrigerator according to an embodiment of the present disclosure.

The refrigerator illustrated in FIG. 5 may include all the components of FIG. 4.

The refrigerator may be an example of the home appliance 100e of FIG. 3.

Referring to FIG. 5, the processor 180 of the refrigerator acquires user identification information (S501).

In one embodiment, the user identification information may include one or more of biometric information of a user and user input information.

The biometric information of the user may be any one of the fingerprint, voice, face or iris of the user.

The processor 180 may acquire the fingerprint of the user through a fingerprint sensor provided in the sensing unit 140.

The processor 180 may receive the voice of the user through the microphone 122.

The processor 180 may acquire the face or iris of the user through an image captured through the camera 121.

The processor 180 of the refrigerator recognizes user based on the acquired user identification information (S503).

The processor 180 may recognize the fingerprint of the user through the fingerprint sensor provided in the sensing unit 140. The processor 180 may identify the user when the recognized fingerprint matches that of a specific user stored in the memory 170.

The processor 180 may recognize the user when a voice feature acquired through the microphone 122 matches that of the specific user stored in the memory 170.

Here, the voice feature is a unique feature of each person and may include any one of a frequency band or a tone of a voice signal.

The processor 180 may recognize the face of the user from the image acquired through the camera 121 using an image recognition model. The processor 180 may determine that the user is recognized when the recognized face of the user matches that of the user stored in the memory 170.

The image recognition model may be an artificial neural network based model supervised-learn through a deep learning algorithm or a machine learning algorithm. The image recognition model may identify the user from image data.

The processor 180 may extract an iris image from the captured facial image of the user and determine whether the extracted iris image matches an iris image prestored in the memory 170.

The processor 180 may determine that the user is recognized when the extracted iris image matches the prestored iris image.

The processor 180 of the refrigerator predicts an item to be used by the recognized user from the recognized user and a current time based on a usage pattern model (S505).

The usage pattern model may be an artificial neural network based model for inferring an item to be used by a user from user identification information and a current time.

The usage pattern model may be supervised-learned through a deep learning algorithm or a machine learning algorithm.

The usage pattern model may be learned by the learning processor 240 of the AI server 200 and installed in the memory 170 of the refrigerator.

In another example, the usage pattern model may be learned by the learning processor 130 of the refrigerator and stored in the memory 170.

The usage pattern model and data used for learning of the usage pattern model will be described with reference to FIGS. 6 and 7.

Figure 6:
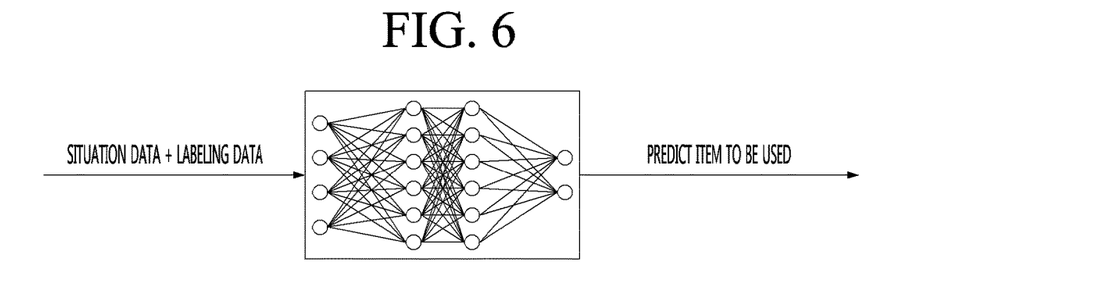
FIG. 6 is a view illustrating a process of training a usage pattern model according to an embodiment of the present disclosure.
Figure 7:
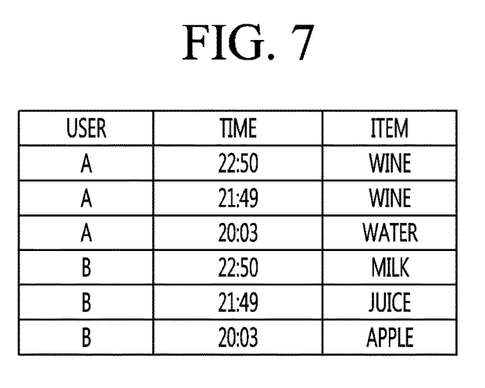
FIG. 7 is a view showing a training data set used for learning of the usage pattern model.

FIG. 6 is a view illustrating a process of training a usage pattern model according to an embodiment of the present disclosure, and FIG. 7 is a view showing a training data set used for learning of the usage pattern model.

First, referring to FIG. 6, the training data set of the usage pattern model 600 may include situation data and labeling data.

The situation data may include identification data for identifying a user and time data.

The labeling data may indicate correct answer data labeled in the situation data. The labeling data may be item identification data for identifying an item to be used by a specific user in a specific time period.

An input feature vector may be extracted from the situation data for learning and input to the usage pattern model 600. The usage pattern model 600 may output a target feature vector as an output result.

The usage pattern model 600 may be learned to minimize a cost function corresponding to a difference between the target feature vector and the identification data of the labeled item.

Referring to FIG. 7, the training data set used for supervised learning of the usage pattern model is shown.

The training data set may include learning data and labeling data.

The learning data may include user identification data and time data, and the labeling data may be item identification data as correct answer data.

The usage pattern model 600 may be learned using the training data set shown in FIG. 7.

FIG. 5 will be described again.

The processor 180 of the refrigerator outputs identification information for identifying the predicted item through the output unit 150 (S507).

The identification information of the predicted item may include one or more of the name of an item or the location of the item in the refrigerator.

The processor 180 may display the identification information for identifying the predicted item through the display unit 151.

In another example, the processor 180 may output the identification information for identifying the predicted item through the sound output unit 152.

In another example, the processor 180 may output the identification information for identifying the predicted item through the light output unit 154. For example, the processor 180 may control the light output unit 154 to output light at a location where the predicted item is disposed, when opening of the door of the refrigerator is detected. To this end, the refrigerator may further include a door sensor for detecting opening or closing of the door.

For example, when a user A is recognized and an item predicted through the usage pattern model is wine, the processor 180 may output light at a location where the wine is disposed. Therefore, the user may easily acquire the location of the wine without searching through the refrigerator.

When a user B is recognized and an item predicted through the usage pattern model is milk, the processor 180 may output light at a location where the milk is disposed.

The identification information of the item may include one or more of the name of the item or the location of the item disposed in the refrigerator.

The processor 180 may output additional information related to the item in addition to the identification information of the item.

The additional information of the item may include a message related to use of the item and a message related to management of the item. This will be described below.

Figure 8:
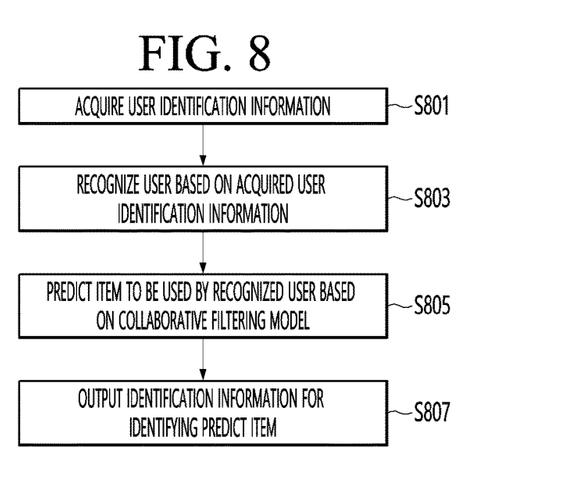
FIG. 8 is a flowchart illustrating a method of providing information on an item at a refrigerator according to another embodiment of the present disclosure.

FIG. 8 is a flowchart illustrating a method of providing information on an item at a refrigerator according to another embodiment of the present disclosure.

In particular, FIG. 8 is a view illustrating a method of predicting an item to be used by an identified user based on a collaborative filtering model.

The processor 180 of the refrigerator acquires user identification information (S801).

For this, refer to the description of step S501 of FIG. 5.

The processor 180 of the refrigerator recognizes a user based on the acquired user identification information (S803).

For this, refer to the description of step S503 of FIG. 5.

The processor 180 of the refrigerator predicts an item to be used by the recognized user based on the collaborative filtering model (S805).

In one embodiment, the collaborative filtering model may refer to a model for automatically predicting an item of interest of the user according to taste information acquired from a plurality of users.

The collaborative filtering model may be learned by a deep learning algorithm or a machine learning algorithm.

The collaborative filtering model may be received from the AI server 200 and installed in the refrigerator.

The processor 180 may predict an item to be used by the recognized user at a current time from the identification information of the recognized user using the collaborative filtering model.

The method of predicting the item to be used by the user using the collaborative filtering model will be described with reference to the following drawings.

Figure 9:
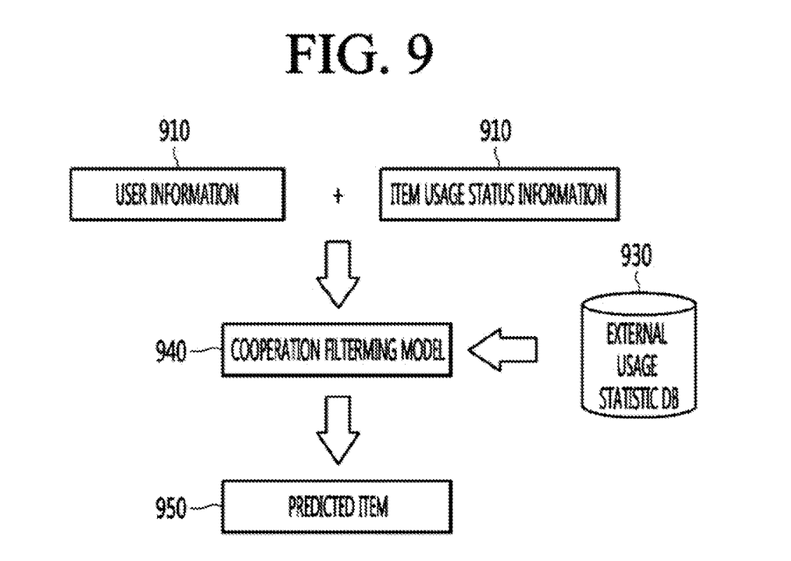
FIG. 9 is a view illustrating a process of predicting an item to be used by a user using a collaborative filtering model according to an embodiment of the present disclosure.

FIG. 9 is a view illustrating a process of predicting an item to be used by a user using a collaborative filtering model according to an embodiment of the present disclosure.

User information 910 may include the age and gender of each of a plurality of users.

Item usage status information 920 may include types of items to be respectively used by the plurality of users in a plurality of time periods.

The user information 910 and the item usage status information 920 may be collected by the AI server 200.

The collaborative filtering model 940 may predict an item to be used by a specific user based on the user information 910 and the item usage status information 920.

The collaborative filtering model 940 may predict the item to be used by the specific user using external usage statistic information, in addition to the user information 910 and the item usage status information 920.

The external usage statistic information 930 may include the user information 910 and the item usage status information 920 and may be collected by a server other than the AI server 200.

The collaborative filtering model 940 searches for users having an item usage pattern similar to that of the specific user using the user information 910 and the item usage status information 920.

Thereafter, the collaborative filtering model 940 may digitize the behaviors of the searched users and predict the item to be used by the specific user using the digitized table.

Figure 10:
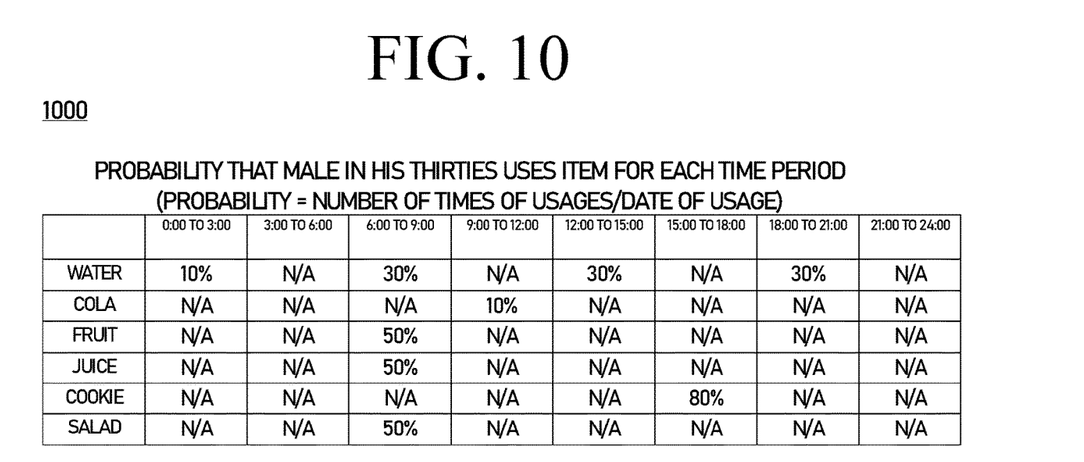
FIG. 10 is a view illustrating a first usage table showing a probability that a male A in his thirties uses an item for each time period according to an embodiment of the present disclosure.

FIG. 10 is a view illustrating a first usage table showing a probability that a male A in his thirties uses an item for each time period according to an embodiment of the present disclosure.

Referring to FIG. 10, a first usage table 1000 shows the probabilities that the male A in his thirties uses the items in a plurality of time periods.

The probability of using the item may be calculated as the number of times of using the item to the date of usage. The usage date may be 24 hours.

The number of times of using the item may indicate the number of times of taking out the item from the refrigerator in a specific time period.

For example, the probability of using water is 10% in a time period of 0:00 to 3:00, is 30% in a time period of 6:00 to 9:00, is 30% in a time period of 12:00 to 15:00 and is 30% in a time period of 18:00 to 21:00.

The first usage table 1000 is an example of a combination of the user information 910 and the item usage status information 920 described with reference to FIG. 9.

Figure 11:
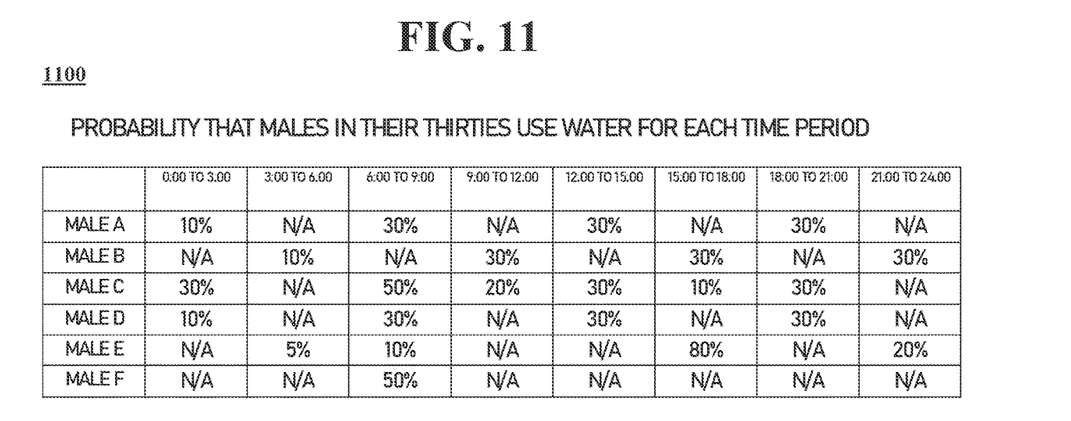
FIG. 11 is a view showing a second usage table showing probabilities that males in their thirties use items for each time period.

FIG. 11 is a view showing a second usage table showing probabilities that males in their thirties use items for each time period.

A second usage table 1100 shows probabilities that the males in their thirties use an item "water" for each time period.

The second usage table 1100 may be acquired based on the first usage table of each of the plurality of males in their thirties.

Referring to FIG. 10, the probability that the male A in his thirties uses water is N/A (0) in several time periods.

The collaborative filtering model 940 may acquire the probability of usage even in a time period having a probability of usage of 0.

For example, even if the probability that the male A in his thirties uses water in a time period of 3:00 to 6:00 is 0, the predicted probability of using water may be obtained using the probabilities that other males B and E in their thirties use water, which are included in the second usage table 1100.

That is, the predicted probability that the male A in his thirties uses water in the time period of 3:00 to 6:00 may be calculated as (10+5)/6=2.5%.

Similarly, the predicted probability of using water in the time period of 9:00 to 12:00 may be calculated as (30+20)/6=8.33%, the predicted probability of using water in the time period of 15:00 to 18:00 may be calculated as (30+80)/6=20%, and the predicted probability of using water in the time period of 21:00 to 242:00 may be calculated as (30+20)/6=8.33%.

In this manner, the collaborative filtering model 940 may calculate the probability of using each item having no usage history for each time period.

Even if there is no usage history of a specific item in a specific time period, it is possible to predict which item is used by the user in the specific time period, by using the collaborative filtering model 940.

Figure 12:
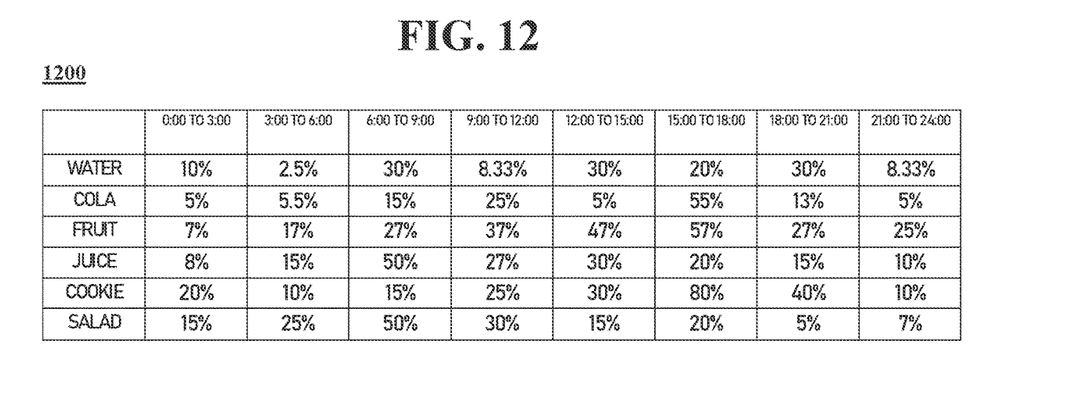
FIG. 12 is a view showing a result of filling the first usage table shown in FIG. 10 with the probabilities that the male A in his thirties uses the items using the collaborative filtering model.

FIG. 12 is a view showing a result of filling the first usage table shown in FIG. 10 with the probabilities that the male A in his thirties uses the items using the collaborative filtering model.

Referring to the usage table 1200 of FIG. 12, a probability that the male A uses cookie among the plurality of items is highest in a time period of 0:00 to 3:00.

Accordingly, the refrigerator may determine cookie as an item having a highest probability of usage when the male A is recognized and a current time is from 0:00 to 3:00.

When a specific user is identified, the refrigerator may recognize the gender and age of the identified user and predict the item to be used by the recognized user at a current time, using the collaborative filtering model 940.

FIG. 8 will be described again.

The processor 180 of the refrigerator outputs identification information for identifying the predicted item through the output unit 150 (S807).

The processor 180 may display the identification information for identifying the predicted item through the display unit 151.

In another example, the processor 180 may output the identification information for identifying the predicted item through the sound output unit 152.

In another example, the processor 180 may output the identification information for identifying the predicted item through the light output unit 154.

Figure 13:
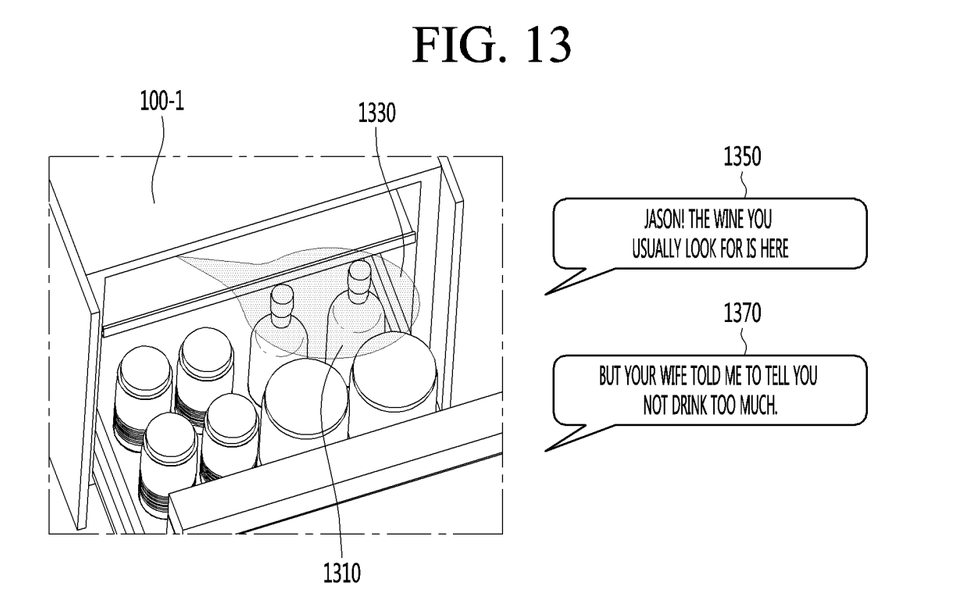
FIGS. 13 and 14 are views illustrating examples of providing identification information for identifying an item to be used by a recognized user and additional information according to an embodiment of the present disclosure.
Figure 14:
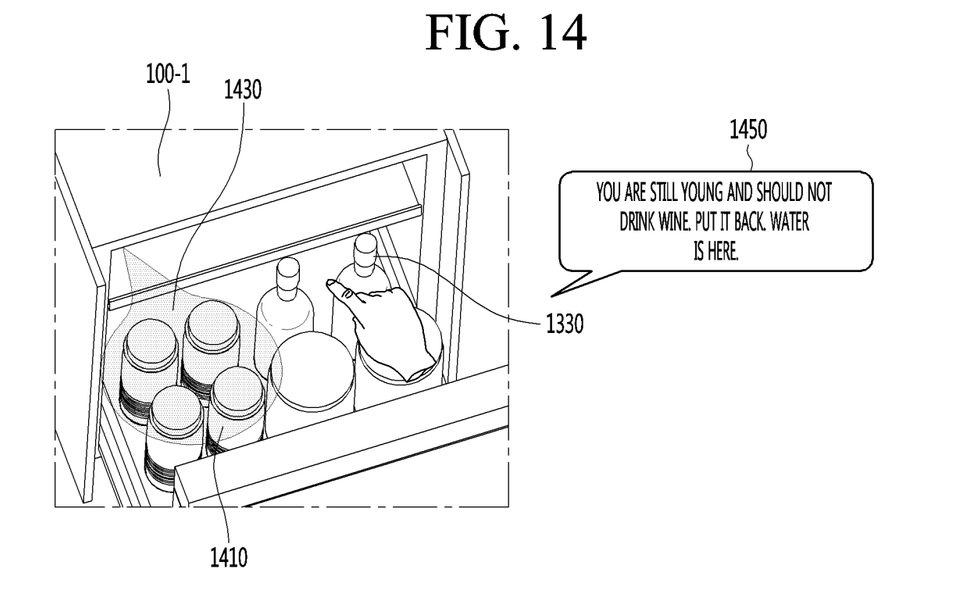

FIGS. 13 and 14 are views illustrating examples of providing identification information for identifying an item to be used by a recognized user and additional information according to an embodiment of the present disclosure.

Referring to FIG. 13, assume that a refrigerator 100-1 acquires identification information of a user and recognizes the user. In FIG. 13, assume that the user is a male A in his thirties.

The refrigerator 100-1 may determine wine 1330 as the item to be used by the user using any one of the usage pattern model or the collaborative filtering model.

When opening of the door is detected, the refrigerator 100-1 may output light through the light output unit in order to identify a location 1310 where the wine 1330 is disposed.

The user may easily take out the item to be used thereby through the output light.

In addition, the refrigerator 100-1 may audibly output a guide notification 1350 reporting the location of the wine 1330 while outputting light.

In addition, the refrigerator 100-1 may further audibly output additional information 1370 related to the wine 1330. The additional information 1370 may be a message recorded by another family member in the refrigerator 100-1.

Next, FIG. 14 will be described.

In FIG. 14, a user recognized by the refrigerator 100-1 is an 8-year-old boy.

The refrigerator 100-1 may recognize that the 8-year-old boy opens the door and his hand reaches the wine 1330 based on an image captured through the camera. In this case, the refrigerator 100-1 may recognize that the item is inappropriately used and audibly output a guide notification 1450 reporting the location of another item 1410.

In addition, the refrigerator 100-1 may output light indicating the location of water 1410 at a location 1430 where water 1410 is disposed.

According to an embodiment of the present disclosure, the user can automatically receive a guide to an item considering the age and gender thereof and thus the user can conveniently use the refrigerator.

In addition, the user can receive a guide to the location of a recommended item and easily access an item provided in the refrigerator.

The present disclosure mentioned in the foregoing description can also be embodied as computer readable codes on a computer-readable recording medium. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, etc. The computer may include the controller 180 of the AI device.

What is claimed is:

1. A refrigerator for providing an item guide service using artificial intelligence, the refrigerator comprising:
   an output interface;
   a sensor configured to acquire user identification information for identifying a user;
   a memory configured to store a collaborative filtering model for determining a food to be used by the user; and
   a processor configured to recognize the user based on the acquired user identification information, predict the food to be used by the recognized user using the collaborative filtering model and output food identification information for identifying the predicted food through the output interface,
   wherein the collaborative filtering model determines the food to be used by the recognized user based on user information including an age and gender of each of a plurality of users and food usage status information including a plurality of probabilities that each of the plurality of users uses a specific food during a plurality of time periods, and
   wherein each probability indicates the number of times of taking the specific food from the refrigerator during a time period based on a day.

2. The refrigerator of claim 1, wherein the collaborative filtering model predicts a probability of using a food having no usage history in a specific time period, using the user information and the food usage status information.

3. The refrigerator of claim 1, wherein the output interface includes a light output interface configured to output light, and
   wherein the processor controls the light output interface to output the light at a location of the food when opening of a door of the refrigerator is detected.

4. The refrigerator of claim 3, wherein the interface further includes a speaker, and
   wherein the processor outputs a guide notification reporting the location of the food through the speaker.

5. The refrigerator of claim 1, wherein the user identification information includes any one of a fingerprint, iris or voice of the user.

6. The refrigerator of claim 1, wherein the food identification information includes one or more of a name of the food or a location of the food in the refrigerator.

* * * * *